(12) United States Patent
Lewis et al.

(10) Patent No.: US 8,311,172 B2
(45) Date of Patent: Nov. 13, 2012

(54) SYNCHRONIZING HIGH DATA-RATE RADIO TRANSCEIVERS

(75) Inventors: Michael Lewis, Märsta (SE); Etan Shirron, Raanana (IL)

(73) Assignee: Infineon Technologies AG, Munich (DE)

(*) Notice: Subject to any disclaimer, the term of this patent is extended or adjusted under 35 U.S.C. 154(b) by 1028 days.

(21) Appl. No.: 11/487,781

(22) Filed: Jul. 17, 2006

(65) Prior Publication Data
US 2008/0013658 A1    Jan. 17, 2008

(51) Int. Cl.
*H04L 7/00* (2006.01)
(52) U.S. Cl. ........ 375/355; 375/354; 375/352; 375/358; 455/69; 455/126; 455/24; 455/423; 370/332
(58) Field of Classification Search .................. 375/355, 375/354, 252, 358; 455/69, 126, 24, 423; 370/332
See application file for complete search history.

(56) References Cited

U.S. PATENT DOCUMENTS

| | | | | |
|---|---|---|---|---|
| 2005/0058107 A1* | 3/2005 | Salokannel et al. | ......... | 370/338 |
| 2005/0059345 A1* | 3/2005 | Palin et al. | ........... | 455/41.2 |
| 2005/0097408 A1* | 5/2005 | Palin et al. | ........... | 714/700 |
| 2005/0266808 A1* | 12/2005 | Reunamaki et al. | ......... | 455/101 |
| 2005/0282494 A1* | 12/2005 | Kossi et al. | ........... | 455/41.2 |
| 2006/0114866 A1* | 6/2006 | Kim et al. | ........... | 370/338 |
| 2007/0149123 A1* | 6/2007 | Palin | ........... | 455/41.2 |

OTHER PUBLICATIONS

The Bluetooth Special Interest Group, Specification of the Bluetooth System, vols. 1 and 2, Core and Profiles: Version 1.1, Feb. 22, 2001.*
"High Rate Ultra Wideband PHY and MAC Standard" ECMA-368, 1st Edition, pp. 1-2, 7-13, 192-194, Dec. 2005.

* cited by examiner

*Primary Examiner* — Zewdu Kassa
(74) *Attorney, Agent, or Firm* — Murphy, Bilak & Homiller, PLLC

(57) ABSTRACT

A method is disclosed of synchronizing a first high data-rate radio transceiver and a second high data-rate radio transceiver. The first high data-rate radio transceiver is associated to a first lower data-rate radio transceiver and the second high data-rate radio transceiver is associated to a second lower data-rate radio transceiver. The method comprises time synchronizing the first and second lower data-rate radio transceivers, determining a timing information concerning operation of the first high data-rate radio transceiver relative to operation of the first lower data-rate radio transceiver, transmitting the timing information to the second lower data-rate radio transceiver, and time synchronizing the first and second high data-rate radio transceivers using the transmitted timing information.

45 Claims, 1 Drawing Sheet

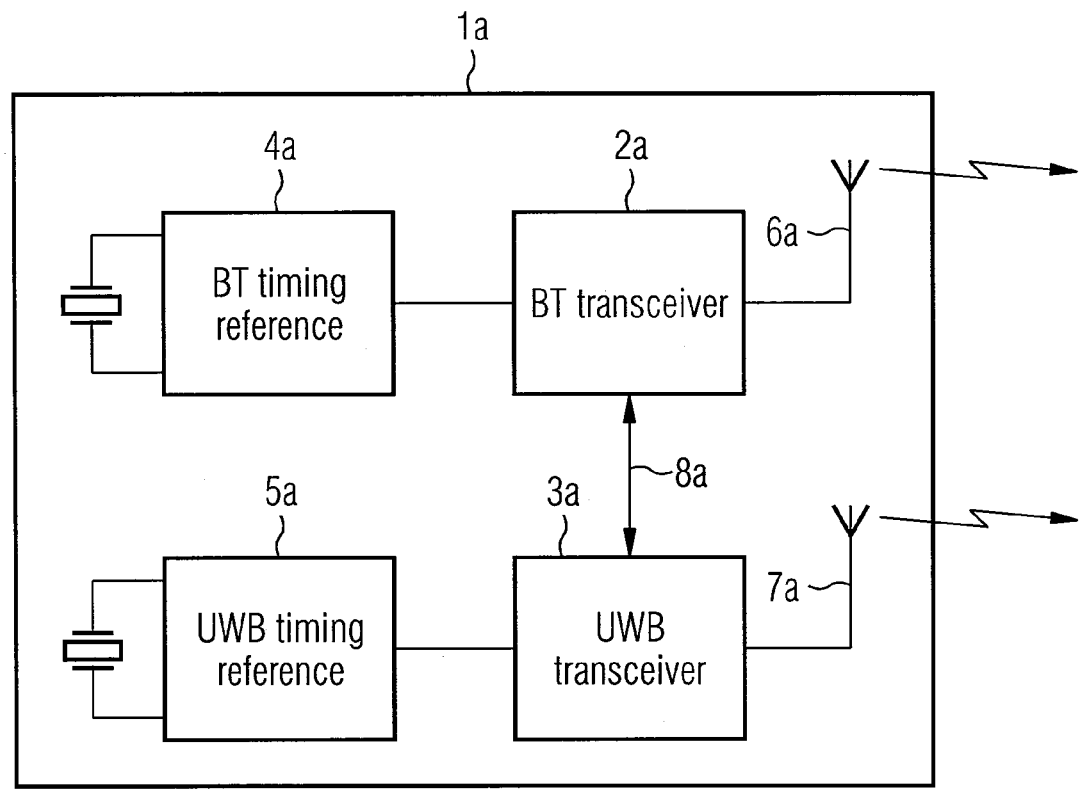
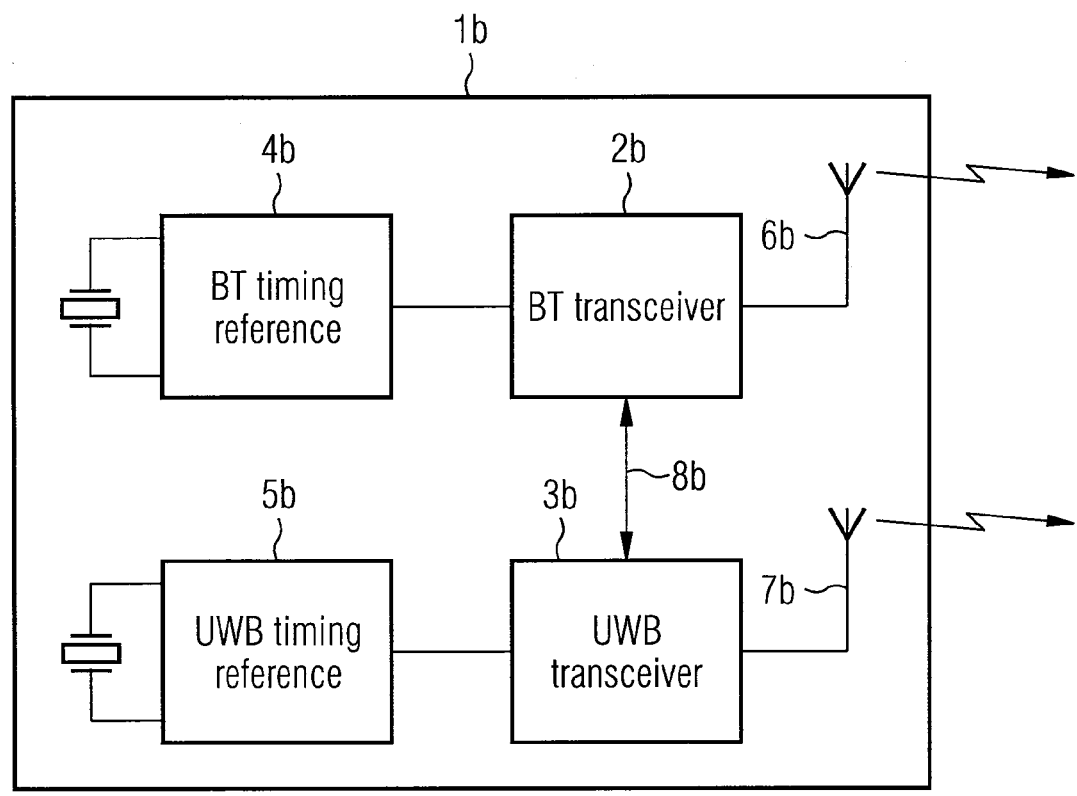

SYNCHRONIZING HIGH DATA-RATE RADIO TRANSCEIVERS

BACKGROUND

The invention relates to synchronizing a first high data-rate radio transceiver and a second high data-rate radio transceiver, and in particular to synchronizing ultra-wideband (UWB) radio transceivers. Further, the invention relates to a radio device comprising a high data-rate radio transceiver adapted to be synchronized with an external high data-rate radio transceiver.

Portable electronic devices such as mobile telephones, photo cameras, displays etc. need to transfer increasingly large quantities of data to and from other devices. Well-known examples for large quantities of data are digital photographs, film sequences or audio files to be downloaded from or transmitted to a computer or shared with other users. A wireless transfer of such data, besides other advantages, avoids the need for adequate cables. However, from the user's view point, any advanced cable replacement technology for portable electronic devices has to comply with the requirements of quick data transfer (preferably as quick as the equivalent wired interface) and low power consumption.

An existing wireless technology with broad penetration in portable electronic devices is the Bluetooth (BT) standard. BT is able to discover efficiently other devices and to transfer data in a power saving manner, with the maximum current consumption from the transceiver being typically only tens of milliamperes. However, the maximum data-rate of about 3 Mbps (megabit per second) is lower than that required by many applications and, thus, can not replace wire interfaces operating at higher data-rates—e.g. USB 2.0 (universal serial bus) operating at 480 Mbps. Further, the energy per bit transferred in BT is high.

UWB, as an example, better meets the requirements for high data-rates and low energy per bit transferred. UWB provides for raw data-rates comparable to wire interfaces as, for example, USB 2.0, and energy efficiency per bit that is an order of magnitude better than BT. Nevertheless, the current consumption of such high data-rate radio transceivers, owing to the high data transfer rates, can reach up to one ampere. Therefore, such high data-rate radio transceivers have a high power consumption during active states.

It has been proposed to combine a high data-rate radio transceiver (e.g. UWB transceiver) and a lower data-rate radio transceiver (e.g. BT transceiver) to combine lower data-rate (e.g. BT) connectivity with high data-rate (e.g. UWB) pipelining. This allows to use the lower data-rate radio transceiver to support control functions of the high data-rate radio transceiver.

BRIEF DESCRIPTION OF THE DRAWING

Aspects of the invention are made more evident in the following detailed description of some embodiments, when read in conjunction with the attached drawing FIGURE, wherein:

FIG. 1 is a block diagram of two radio devices each of which comprising a high data-rate radio transceiver and a lower data-rate radio transceiver.

DETAILED DESCRIPTION

In the following description and claims, a high data-rate radio transceiver distinguishes from a lower data-rate radio transceiver in that the maximum data-rate of the radio link established by the high data-rate radio transceiver is higher than the maximum data-rate of the radio link established by the lower data-rate radio transceiver. Though typically the maximum data-rate of a radio link established by a high data-rate radio transceiver is higher than 50 Mbps, a radio transceiver providing for considerably lower maximum radio link data-rates, e.g. 3 Mbps, may still represent a high data-rate radio transceiver if the maximum data-rate of the radio link established by the corresponding lower data-rate radio transceiver is lower. On the other hand, a lower data-rate radio transceiver may provide for radio link data-rates of e.g. hundreds of Mbps given the maximum radio link data-rate of the corresponding high data-rate radio transceiver is higher.

Furthermore, for the sake of simplicity, the invention is explained in the following using an embodiment with a UWB high data-rate radio transceiver and a BT lower data-rate radio transceiver. It should be understood that other wireless technologies or standards may be used to implement the invention, which, therefore is not limited to BT and/or UWB connectivity. Further, although the following description is made in the context of BT and UWB, nearly all techniques described herein (as for instance time slots, beacon period, packets, OFDM etc.) are general concepts in the art and should be understood to be generally disclosed for all communication systems using such techniques.

Referring to FIG. 1, a first radio device 1a comprises a lower data-rate radio transceiver 2a, in the following denoted as BT transceiver, and a high data-rate radio transceiver 3a, in the following denoted as UWB transceiver. The BT transceiver 2a is clocked by a clock 4a and the UWB transceiver 3a is clocked by a clock 5a. The BT transceiver 2a couples to a first antenna 6a and the UWB transceiver 3a couples to a second antenna 7a. Alternatively, both transceivers 2a, 3a may use the same antenna or multiply antennas, respectively. The BT transceiver 2a and the UWB transceiver 3a are coupled to each other via a communication link 8a.

Clock 4a may be represented by the free running native clock CLKN stipulated in the BT specification having a resolution of 1 µs, a clock accuracy of ±20 ppm and a 10 µs jitter. Assuming, as an example which will be used in the following, that the UWB transceiver 3a operates according to the UWB industry standard ECMA-368, the clock 5a is required to have an accuracy of ±20 ppm with a resolution of 1 µs.

The ECMA-368 standard specifies a UWB physical layer for a wireless personal area network supporting radio link data-rates of 53.3 Mbps/s, 80 Mbps/s, 106.7 Mbps/s, 160 Mbps/s, 200 Mbps/s, 320 Mbps/s, 400 Mbps/s and 480 Mbps/s. Information is transmitted according to a multi-band orthogonal frequency division modulation (MB-OFDM) scheme using a total of 110 frequency sub-carriers. The UWB transceiver 3a operates in time slots denoted as MAS (medium access slot), which have a length of 256 µs. 256 MAS are structured into a superframe of duration 65.536 µs, i.e. superframes repeat every 65.536 µs. Each superframe starts with a BP (beacon period) which extends over one or more contiguous MASs. The start of the first MAS in the BP, i.e. the superframe start-time, is called the beacon period start-time (BPST). Coordination of UWB devices within radio range is achieved by the exchange of such beacon superframes.

Periodic beacon transmission enables UWB device discovery and supports dynamic network organization. More specifically, beacons provide the basic timing for a UWB network and carry reservation and scheduling information for accessing the medium. Further, the MAS (time slots) reserved for transmission in the superframe are announced within the BP.

Generally, in order to time synchronize two UWB transceivers by carrying out a superframe synchronization (in other standards more generally denoted as frame synchronization), the UWB transceiver to be synchronized has to be active long enough to receive the beacon transmissions, e.g. worst case 65.536 μs, average case 32.768 μs. The energy consumed by this active state synchronization period is significant, given the high current consumption of a UWB transceiver. Further, apart from initial time synchronization, time resynchronization may be necessary after a UWB transceiver has passed into a low-power idle mode where the timing can not be maintained with the required accuracy.

FIG. 1 shows a second radio device 1b which may be identical to the first radio device 1a. Thus, lower data-rate radio transceiver 2b, high data-rate radio transceiver 3b, clock 4b, clock 5b, first antenna 6b, second antenna 7b and communication link 8b correspond to lower data-rate radio transceiver 2a, high data-rate radio transceiver 3a, clock 4a, clock 5a, first antenna 6a, second antenna 7a and communication link 8a, respectively.

The UWB transceiver 3b is time synchronized to the UWB transceiver 3a. According to the embodiment of the invention, BT (or other low data-rate) connectivity is used to reduce the energy consumed in time synchronizing the UWB transceivers 3a, 3b.

For instance, according to the BT standard, one BT transceiver 2a or 2b is the master and the other BT transceiver 2b or 2a is a slave. Only as an example, it is assumed that the BT transceiver 2a is the master transceiver and the BT transceiver 2b is a slave transceiver. The master BT transceiver 2a defines the clock reference for the system, i.e. for the master BT transceiver 2a as well as for the slave BT transceiver 2b. More specifically, when the BT connection between the master BT transceiver 2a and the slave BT transceiver 2b is established, the master BT transceiver's internal clock (which is the native clock 4a plus a specific internal offset) is communicated to the slave BT transceiver 2b. The slave BT transceiver 2b adds an appropriate internal offset to its native clock 4b to be synchronized to the master BT transceiver's internal clock. Since the native clocks 4a, 4b are free running, the slave BT transceiver 2b has to update its estimate of the master's clock (i.e. the appropriate internal offset) on reception of each transmission from the master BT transceiver 2a. This implies that bounds on the absolute time error of the estimate can be calculated. Thus, an information concerning the absolute timing error between the master BT transceiver 2a and the slave BT transceiver 2b is available in radio device 1b.

First, the case is considered where the UWB transceiver 3a wishes to initiate UWB communication with UWB transceiver 3b which is inactive. In this case, a superframe synchronization has to be performed between UWB transceiver 3a and UWB transceiver 3b.

UWB transceiver 3a commands the associated BT transceiver 2a to establish a BT connection to the BT transceiver 2b associated with the UWB transceiver 3b or to acknowledge an already existing BT connection.

Then, the first radio device 1a determines a timing information relating to the BT transceiver's 2a internal clock. This timing information comprises the time at which the UWB superframe shall start and, depending on the time synchronization task to be performed, may possibly comprise further time information, e.g. the time at which the UWB transmission shall start (UWB transmission start-time).

If the UWB transceiver 3a is not yet involved in UWB operation, the first radio device 1a is free to determine for itself when to start a first UWB superframe (i.e. to choose the BPST) and when to set the UWB transmission start-time. On the other hand, if the UWB transceiver 3a is already operating, the superframe timing is already decided. In this case, the UWB transmission start-time has to be coordinated with the ongoing reservation process of timeslots within the UWB transceiver 3a.

The timing information relating to the BT transceiver's 2a internal clock may be determined by passing software messages across the communication link 8a between the BT transceiver 2a and the UWB transceiver 3a. In an integrated solution, the timing information may be directly available.

The first radio device 1a which will initiate a UWB transmission then sends a BT transmission via BT transceiver 2a to the BT transceiver 2b in the second radio device 1b. This BT transmission contains the timing information. The BT transmission may be a BT packet in which the timing information is contained and encoded by time offsets.

The second radio device 1b receives the UWB timing information at the BT transceiver 2b. Note that the BT transceiver 2b is already synchronized with the BT transceiver 2a and a (worst case) maximum absolute time error between the internal clock of the BT transceiver 2a and the internal clock of the BT transceiver 2b is available in the second radio device 1b. The second radio device 1b then subtracts a worst case uncertainty time estimate from the timing information (i.e. from the UWB superframe start-time and possibly from other times contained in the timing information) to determine a calculated operation start-time when the UWB transceiver 3b should be enabled.

The worst case uncertainty time estimate typically comprises the maximum absolute time error between the internal clocks of the BT transceivers 3a, 3b and the transmit-time uncertainties for messages passing through the communication link 8a and the communication link 8b in each radio device 1a, 1b.

This worst case uncertainty time estimate is typically a constant value. In order to calculate this constant value at the second radio device 1b, the first radio device 1a informs the second radio device 1b of the transmit-time uncertainty of its communication link 8a. It is possible, that this transmit-time uncertainty information is transmitted as part of the BT transmission (e.g. within the same BT packet) informing the second radio device 1b of the timing information. Alternatively, this transmit-time uncertainty information may be transmitted by separate communication, e.g. during an initialization period on establishing the BT connection.

If no transmit-time uncertainty information relating to the communication link 8a is transmitted by the first radio device 1a, the second radio device 1b may use a worst case default value instead.

The calculated operation start-time is then used in the second radio device 1b to enable the UWB transceiver 3b and initiate frame synchronization between the UWB transceiver 3a and the UWB transceiver 3b. According to the above, the operation start-time shall be as late as possible but early enough to guarantee successful superframe synchronization. The UWB transceiver 3b can time synchronize with the UWB slot timing of the transmitting UWB transceiver 3a and an arbitrary sequence of UWB superframe exchanges can then occur.

If the received timing information further contains a UWB transmission start-time, i.e. information relating to reserved MAS, then this information may be additionally used for time synchronization purposes. Otherwise, as already mentioned, information relating to UWB transmission start-time and on reserved MAS for transmission may be included in the BP and transmitted by UWB connectivity.

Second, the case is considered, where the UWB transceiver 3a wishes to resume UWB communication with UWB transceiver 3b which is already superframe synchronized to UWB transceiver 3a. This may be the case when the UWB transceiver 3b is in an inactive low power-state.

In this case, the timing information may comprise the UWB transmission start-time, the UWB superframe start-time and other time information as described above. Which time information is included or used in the radio device 1b depends on the specific time synchronization tasks being performed by the UWB transceiver 3b and/or being supported by the BT connectivity.

If the existing superframe synchronization between transceiver 3a and transceiver 3b is sufficiently good, no further frame synchronization process is necessary. It is assumed that the UWB transmission start-time synchronization shall be performed via BT connectivity. Then, the timing information must include the UWB transmission start-time which has previously been decided in the first radio device 1a. The second radio device 1b then calculates the operation start-time for providing UWB transmission start-time synchronization. The calculation is performed in an analogous way as described above to calculate the operation start-time for providing UWB superframe synchronization. That is, the maximum absolute time error between the internal clocks of the BT transceivers 2a, 2b and transmit-time uncertainties for messages passing through the communication links 8a and 8b may be taken into account. At the calculated operation start-time the UWB transceiver 3b is activated. Activation is as late as possible but early enough to guarantee that the BT-announced UWB communication beginning at the UWB transmission start-time is safely received at the UWB transceiver 3b.

If the existing superframe synchronization between transceiver 3a and transceiver 3b is not sufficiently good, additional superframe fine synchronization must be performed. This may be accomplished by using the BT-announced UWB superframe start-time information as already described. Further, the UWB transmission start-time synchronization may be performed by using the BT-announced UWB transmission start-time information. The operation start-time is calculated such that the UWB transceiver 3b is activated as late as possible, but early enough to guarantee that both synchronization processes (superframe fine synchronization and UWB transmission start-time synchronization) are successfully completed before UWB transmission starts.

Also in the case, where UWB transceiver 3b is already at least coarsely superframe synchronized to UWB transceiver 3a, it is possible that only the UWB superframe start-time information is used in the second radio device 1b for fine superframe synchronization purposes. The transmission start-time synchronization may then be implemented on conventional UWB connectivity.

Often, high data-rate radio transceivers require a higher clock accuracy as lower data-rate radio transceivers. This is actually the case for UWB transceivers 3a, 3b and BT transceivers 2a, 2b. Then, after the UWB superframe synchronization has been carried out using BT connectivity as described above, a final UWB superframe fine synchronization process based on UWB connectivity has to be added. However, also in this case, the embodiment of the invention provides for power savings because the final UWB superframe fine synchronization process based on UWB connectivity is carried out much quicker than the complete superframe synchronization process on UWB connectivity.

Thus, in the embodiment of the invention, the amount of time needed for time synchronizing the UWB transceiver 3b to the UWB transceiver 3a can be reduced from about tens of milliseconds to tens to hundreds of microseconds, thereby substantially reducing the power consumption in the UWB transceiver 3b. Different implementations can trade energy efficiency against implementation complexity by using mechanisms with more or less timing uncertainty to synchronize the UWB and BT components.

Referring again to FIG. 1, many different device implementations are possible. In the description above, signals transmitted over the communication links 8a, 8b are software generated messages and thus, significant transmission time uncertainties for these messages may occur. However, in contrast to the indirect communication established by software controlled signaling via the communication links 8a, 8b, it is also possible to implement a direct communication by transmitting signals in the form of timing pulses over the communication links 8a, 8b. In this case, the transmission-time uncertainty for signaling may be considerably lower.

The BT transceiver 2a, 2b and the UWB transceiver 3a, 3b may be integrated on the same chip. In this case, the communication link 8a, 8b is designed as intra-chip wiring. On the other hand, the BT transceiver 2a, 2b and the UWB transceiver 3a, 3b may be integrated on different chips and the communication link 8a, 8b then comprises inter-chip wiring between pins on the separate chips.

Further, it is possible that the BT transceiver 2a, 2b and the UWB transceiver 3a, 3b use the same timing reference, i.e. the two native clocks 4a, 5a or 4b, 5b are replaced by a shared native clock operating both transceivers 2a, 3a or 2b, 3b.

Since the initial timings of the transmissions are determined by the first (transmitting) radio device 1a, it is not required for the second (receiving) radio device 1b to have a complete knowledge of the UWB frame structure and MAC protocol. The embodiment of the invention, therefore, allows for efficient asymmetric UWB master-slave relation, where the master in the first (transmitting) radio device 1a follows the full ECMA-368 UWB standard and determines allowed transmission times, while slaves in second (receiving) radio devices 1b implement a simplified protocol under direction of the UWB master transceiver 1a. This is particular efficient where the UWB slave radio device 1b is a portable device and the UWB master radio device 1a is a device with a power supply (e.g. a television or desktop computer).

What is claimed is:

1. A method of determining an operation start time of a second high data-rate radio transceiver in a system comprising a first high data-rate radio transceiver and the second high data-rate radio transceiver, the first high data-rate radio transceiver being associated to a first lower data-rate radio transceiver and the second high data-rate radio transceiver being associated to a second lower data-rate radio transceiver, the method comprising:
    time synchronizing the first and second lower data-rate radio transceivers,
    determining timing information comprising data indicating a start time of a transmission operation of the first high data-rate radio transceiver relative to a clock of the first lower data-rate radio transceiver,
    transmitting the timing information to the second lower data-rate radio transceiver,
    determining the operation start time of the second high data-rate radio transceiver by calculating the operation start-time of the second high data-rate radio transceiver using the transmitted timing information,
    enabling the second high data-rate radio transceiver based on the operation start time, and initiating frame synchronization between the first high data-rate radio transceiver and the second high data-rate radio transceiver based on the operation start time.

2. The method according to claim 1, wherein:
time synchronizing the first and second lower data-rate radio transceivers is accomplished by time synchronizing the second lower data-rate radio transceiver to a clock of the first lower data-rate radio transceiver.

3. The method according to claim 2, wherein:
the timing information is determined relative to the clock.

4. The method according to claim 1, wherein:
time synchronizing the first and second high data-rate radio transceivers is accomplished by time synchronizing the second high data-rate radio transceiver to the first high data-rate radio transceiver.

5. The method according to claim 1, wherein:
the timing information comprises frame time data of frames used for transmission by the first high data rate radio transceiver.

6. The method according to claim 1, wherein:
the timing information comprises transmission start-time data for the transmission start-time of the first high data-rate radio transceiver.

7. The method according to claim 1, wherein:
the timing information comprises frame time data of frames used for transmission by the first high data-rate radio transceiver and transmission start-time offset data representing a transmission start-time relative to frame timing.

8. The method according to claim 1, further comprising:
transmitting a timing uncertainty information to the second lower data-rate radio transceiver.

9. The method according to claim 8, wherein:
the timing uncertainty information comprises timing uncertainty data relating to the time uncertainty of a clock of the first lower data-rate radio transceiver.

10. The method according to claim 8, wherein:
the timing uncertainty information comprises timing uncertainty data relating to a transmit-time uncertainty of the signal transmission through a communication link between the first lower data-rate radio transceiver and the first high data-rate radio transceiver.

11. The method according to claim 8, wherein:
the timing uncertainty information is transmitted separately from the timing information.

12. The method according to claim 8, wherein:
the first and second lower data-rate radio transceivers are Bluetooth-transceivers.

13. The method according to claim 1, wherein:
the first and second high data-rate radio transceivers are ultra-wideband transceivers.

14. A radio device, comprising:
a high data-rate radio transceiver,
a lower data-rate radio transceiver and
a communication link between the high data-rate radio transceiver and the lower data-rate radio transceiver to transmit a signal used to determine a timing information comprising data indicating a start time of a transmission operation of the high data-rate radio transceiver relative to a clock of the lower data-rate radio transceiver,
wherein the timing information is used to enable a high data-rate radio transceiver external to the radio device and initiate frame synchronization between the high data-rate radio transceiver included in the radio device and the high data-rate radio transceiver external to the radio device.

15. The radio device according to claim 14, wherein:
the high data-rate radio transceiver and the lower data-rate radio transceiver are integrated on a single chip, and
the communication link is implemented by intra-chip wiring.

16. The radio device according to claim 14, wherein:
the high data-rate radio transceiver and the lower data-rate radio transceiver are integrated on different chips and the communication link is implemented by inter-chip wiring.

17. The radio device according to claim 14, wherein:
the signal transmitted over the communication link comprises software-generated messages.

18. The radio device according to claim 14, wherein:
the signal transmitted over the communication link comprises timing pulses.

19. The radio device according to claim 14, wherein:
the lower data-rate radio transceiver is a Bluetooth-transceiver.

20. The radio device according to claim 14, wherein:
the high data-rate radio transceiver is an ultra-wideband transceiver.

21. A radio device, comprising:
a high data-rate radio transceiver,
a lower data-rate radio transceiver,
a determination unit coupled to determine a timing information comprising data indicating a start time of a transmission operation of the high data-rate radio transceiver relative to a clock of the lower data-rate radio transceiver, the timing information being used to determine the operation start time of an external high data-rate radio transceiver by calculating an operation start-time of the high data-rate radio transceiver, and
a transmitter to radio-link transmit the timing information to the external lower data-rate radio transceiver,
wherein the operation start time of the external high data-rate radio transceiver is used to enable the external high data-rate radio transceiver and initiate frame synchronization between the high data-rate radio transceiver included in the radio device and the external high data-rate radio transceiver.

22. The radio device according to claim 21, wherein:
the timing information comprises frame time data of frames used for transmission by the first high data-rate radio transceiver.

23. The radio device according to claim 21, wherein:
the timing information comprises transmission start-time data for the transmission start-time of the first high data-rate radio transceiver.

24. The radio device according to claim 21, wherein:
the timing information comprises frame time data of frames used for transmission by the first high data-rate radio transceiver and transmission start-time offset data representing a transmission start-time relative to frame timing.

25. The radio device according to claim 21, further comprising:
a timing uncertainty unit to provide a timing uncertainty information to be transmitted to the external lower data-rate radio transceiver.

26. The radio device according to claim 25, further comprising:
a clock of the lower data-rate radio transceiver, wherein the timing uncertainty information comprises timing uncertainty data relating to the time uncertainty of the clock.

27. The radio device according to claim 25, further comprising:
a communication link between the high data-rate radio transceiver and the lower data-rate radio transceiver to transmit a signal used to determine the timing information, wherein the timing uncertainty information comprises timing uncertainty data relating to a transmit-time uncertainty of the signal transmission through the communication link.

28. The radio device according to claim 21, wherein:
the lower data-rate radio transceiver is a Bluetooth-transceiver.

29. The radio device according to claim 21, wherein:
the high data-rate radio transceiver is an ultra-wideband transceiver.

30. A radio device, comprising:
a high data-rate radio transceiver,
a lower data-rate radio transceiver,
a time information receiver unit to receive a timing information at the lower data-rate radio transceiver, the timing information comprising data indicating a start time of a transmission operation of a high data-rate radio transceiver relative to a clock of a lower data-rate radio transceiver of an external radio device transmitting the timing information,
a calculator unit to calculate an operation start-time of the high data-rate radio transceiver using the received timing information, and
wherein the operation start-time of the high data-rate radio transceiver is used to enable the high data-rate radio transceiver and initiate frame synchronization between the high data-rate radio transceiver and the high data-rate radio transceiver included in the external radio device.

31. The radio device according to claim 30, wherein:
the timing information comprises frame time data of frames used for transmission by the first high data-rate radio transceiver of the external radio device.

32. The radio device according to claim 30, wherein:
the timing information comprises transmission start-time data for the transmission start-time of the first high data-rate radio transceiver of the external radio device.

33. The radio transceiver according to claim 30, wherein:
the timing information comprises frame time data of frames used for transmission by the first high data-rate radio transceiver of the external radio device and transmission start-time offset data representing a transmission start-time relative to frame timing of the external radio device.

34. The radio device according to claim 30,
wherein the calculator unit to calculate the operation start time of the high data-rate radio transceiver further uses a timing uncertainty information received at the lower data-rate radio transceiver.

35. The radio device according to claim 34, wherein:
the timing uncertainty information comprises timing uncertainty data relating to a time uncertainty of a clock in the external radio device.

36. The radio device according to claim 34, wherein:
the timing uncertainty information comprises timing uncertainty data relating to signal transmission through a communication link between a high data-rate radio transceiver and a lower data-rate radio transceiver of the external radio device.

37. The radio device according to claim 30, wherein:
the lower data-rate radio transceiver is a Bluetooth-transceiver.

38. The radio device according to claim 30, wherein:
the high data-rate radio transceiver is an ultra-wideband transceiver.

39. A radio link system, comprising:
a first radio device having a first high data-rate radio transceiver and a first lower data-rate radio transceiver,
a second radio device having a second high data-rate radio transceiver and a second lower data-rate radio transceiver,
and being adapted to:
determine a timing information comprising data indicating a start time of a transmission operation of the first high data-rate radio transceiver relative to a clock of the first lower data-rate radio transceiver,
transmit the timing information to the second lower data-rate radio transceiver, and
determine an operation start time of the second high data-rate radio transceiver by calculating the operation start-time of the second high data-rate radio transceiver using the transmitted timing information,
wherein the operation start-time of the second high data-rate radio transceiver is used to enable the second high data-rate radio transceiver and initiate frame synchronization between the first high data-rate radio transceiver and the second high data-rate radio transceiver.

40. The method of claim 1, wherein the high data-rate radio transceivers and the lower data-rate radio transceivers have different timing.

41. The radio device of claim 14, wherein the high data-rate radio transceiver and the lower data-rate radio transceiver have different timing.

42. The radio device of claim 21, wherein the high data-rate radio transceiver and the lower data-rate radio transceiver have different timing.

43. The radio device of claim 30, wherein the high data-rate radio transceiver and the lower data-rate radio transceiver have different timing.

44. The radio link system of claim 39, wherein the high data-rate radio transceivers and the lower data-rate radio transceivers have different timing.

45. The method according to claim 1, wherein the data comprised in the timing information is encoded by time offsets and transmitted in packets.

* * * * *